(12) United States Patent
Chen et al.

(10) Patent No.: US 8,305,745 B2
(45) Date of Patent: Nov. 6, 2012

(54) DISPLAY DEVICE AND HOUSING STRUCTURE OF THE DISPLAY DEVICE

(75) Inventors: Chih-Hsiung Chen, Taipei Hsien (TW); Shuang-Ji Jiang, Taipei Hsien (TW); Yu-Yin Chiang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 270 days.

(21) Appl. No.: 12/903,169

(22) Filed: Oct. 12, 2010

(65) Prior Publication Data

US 2011/0182009 A1 Jul. 28, 2011

(30) Foreign Application Priority Data

Jan. 27, 2010 (TW) .............................. 99201660 U (51) Int. Cl.
*G06F 1/16* (2006.01)

(52) U.S. Cl. ......... 361/679.21; 361/679.29; 361/679.02; 248/917

(58) Field of Classification Search ............. 361/679.21, 361/679.29

See application file for complete search history.

(56) References Cited

U.S. PATENT DOCUMENTS

| | | | | |
|---|---|---|---|---|
| 7,233,486 B2 * | 6/2007 | Kim | ......................... | 361/679.29 |
| 8,047,489 B2 * | 11/2011 | Watanabe | ................ | 248/292.14 |
| 8,059,392 B2 * | 11/2011 | Hsu et al. | ................. | 361/679.21 |
| 8,218,304 B2 * | 7/2012 | Wu et al. | .................. | 361/679.21 |
| 2003/0201372 A1 * | 10/2003 | Dozier | ........................ | 248/286.1 |
| 2007/0064388 A1 * | 3/2007 | Uchizono et al. | ............. | 361/690 |
| 2008/0186664 A1 * | 8/2008 | Chang et al. | .................. | 361/681 |
| 2009/0185345 A1 * | 7/2009 | Sun et al. | ................. | 361/679.58 |

* cited by examiner

*Primary Examiner* — Anthony Q Edwards
(74) *Attorney, Agent, or Firm* — The Mueller Law Office, PC (57) ABSTRACT

A housing structure includes a casing unit for connection with a selected one of first and second display panels and defining a receiving space for receiving an electronic component module used for connecting electrically with one of the first and second display panels, and two side frames respectively connected to left and right sides of the casing unit at different height positions. When the casing unit and the side frames are connected to one of the first and second display panels, a third fastening hole set of each side frame is adapted to be aligned with a first or second fastening hole set of the first or second display panel so that the side frames can be connected to the selected one of the first and second display panels, thereby reducing the cost of making molds for the housing structure.

20 Claims, 7 Drawing Sheets

DISPLAY DEVICE AND HOUSING STRUCTURE OF THE DISPLAY DEVICE

CROSS-REFERENCE TO RELATED APPLICATION

This application claims priority of Taiwanese Application No. 099201660, filed on Jan. 27, 2010.

BACKGROUND OF THE INVENTION

1. Field of the Invention

This invention relates to a housing structure of a display device, more particularly to a housing structure of a display device for installation of a display panel thereto.

2. Description of the Related Art

A conventional housing structure of a display device for installation of a display panel and the necessary electronic components inside thereof is made by a molding method to form a plurality of housing components. The housing components are then assembled to form the housing structure of the display device for installation of the aforesaid display panel and the necessary electronic components thereto. However, when the size of the display panel is large, the size of the mold is also large. Further, when it is required to make display devices of different size specifications, molds for different sizes of display panels must be made to form different size specifications of housing components. This kind of method does not conform to production requirements for 3C electronic devices, profits for which are getting increasingly lower. Hence, the present invention is involved in the area of developing a single specification of a housing component that is applicable for display panels of different size specifications. Simultaneously, the present invention aims to resolve issues related to minimizing the cost of making molds and reducing the size of the molds.

SUMMARY OF THE INVENTION

Therefore, an object of the present invention is to provide a housing structure of a display device that can accommodate installation of differently sized display panels thereto.

Another object of the present invention is to minimize the cost of making molds and reduce the size of the molds of the housing structure of the display device.

Hence, a housing structure of a display device is adapted to provide installation of a selected one of first and second display panels thereto. The first display panel has a rear face provided with a first fastening hole set. The second display panel has a rear face provided with a second fastening hole set. The housing structure comprises a casing unit and two side frames. The casing unit includes a seat body for connection with the rear face of one of the first and second display panels and defining a receiving space for receiving therein an electronic component module which is used for connecting electrically with one of the first and second display panels. A cover body is connected to the seat body, and covers the receiving space. Each of the side frames is provided with a third fastening hole set. The side frames are respectively disposed on and connected to left and right sides of the casing unit at a selected one of a first height position and a second height position. When the side frames are in the first height position, the third fastening hole set is adapted to be aligned with the first fastening hole set so that the side frames can be connected to the rear face of the first display panel, and when the side frames are in the second height position, the third fastening hole set is adapted to be aligned with the second fastening hole set so that the side frames can be connected to the rear face of the second display panel.

A display device of the present invention comprises a display panel and a housing structure. The housing structure includes a casing unit and two side frames. The casing unit includes a seat body connected to a rear face of the display panel and defining a receiving space for receiving therein an electronic component module which is used for connecting electrically with the display panel, and a cover body connected to the seat body and covering the receiving space. Each side frame includes a main plate connected to the rear face of the display panel, and a connecting plate including a first plate portion and a second plate portion interconnected to form an L-shaped body. The first plate portion is connected to the main plate such that the second plate portion is disposed rearwardly of the main plate. The side frames are connected respectively to the left and right sides of the casing unit through the second plate portions of the connecting plates of the side frames.

The advantage of the present invention resides in that through the structural design of the seat body and the side frames, a single size specification applicable for differently sized display panels is realized. Hence, the housing structure of the display device does not require different molds for some of the components thereof for different sizes of display panels, thereby minimizing the number of required molds and the costs associated with the molds.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

The above-mentioned and other technical contents, features, and effects of this invention will be clearly presented from the following detailed description of two preferred embodiments in coordination with the reference drawings.

Figure 1:
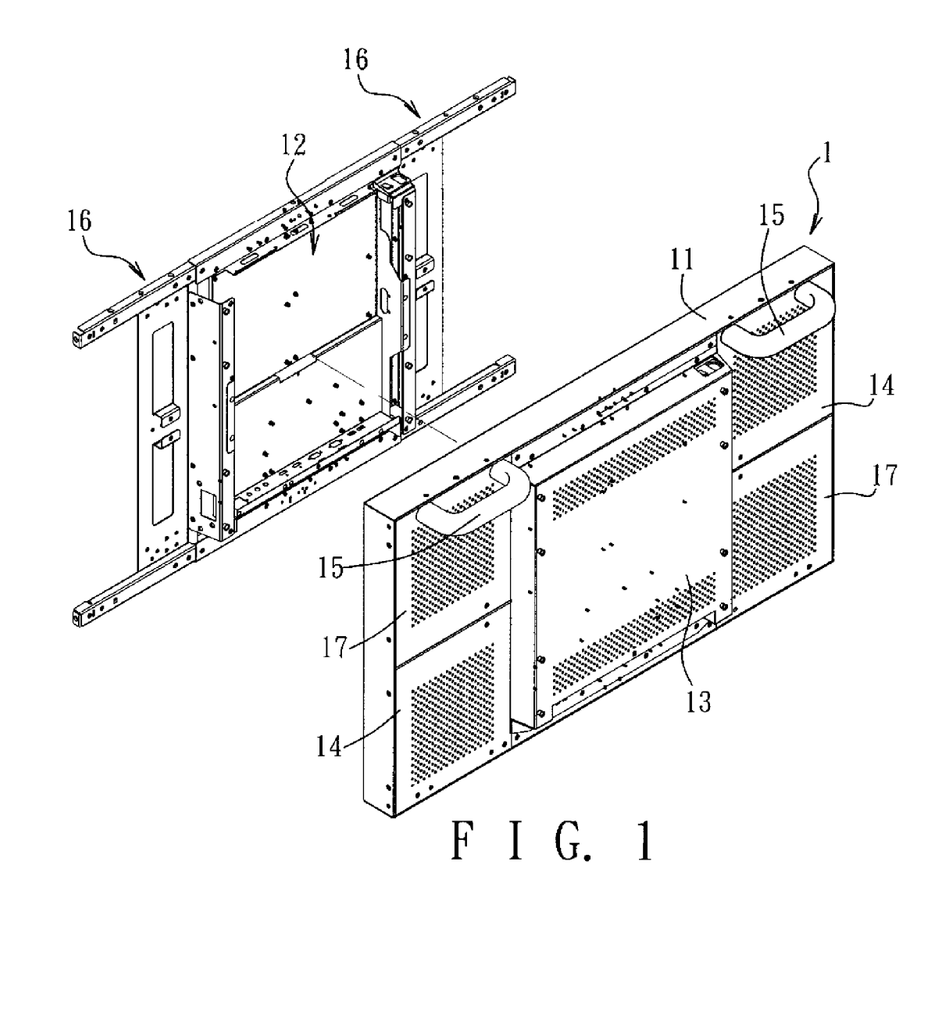
FIG. 1 is a partly exploded perspective view of a housing structure of a display device according to the preferred embodiment of the present invention.
Figure 2:
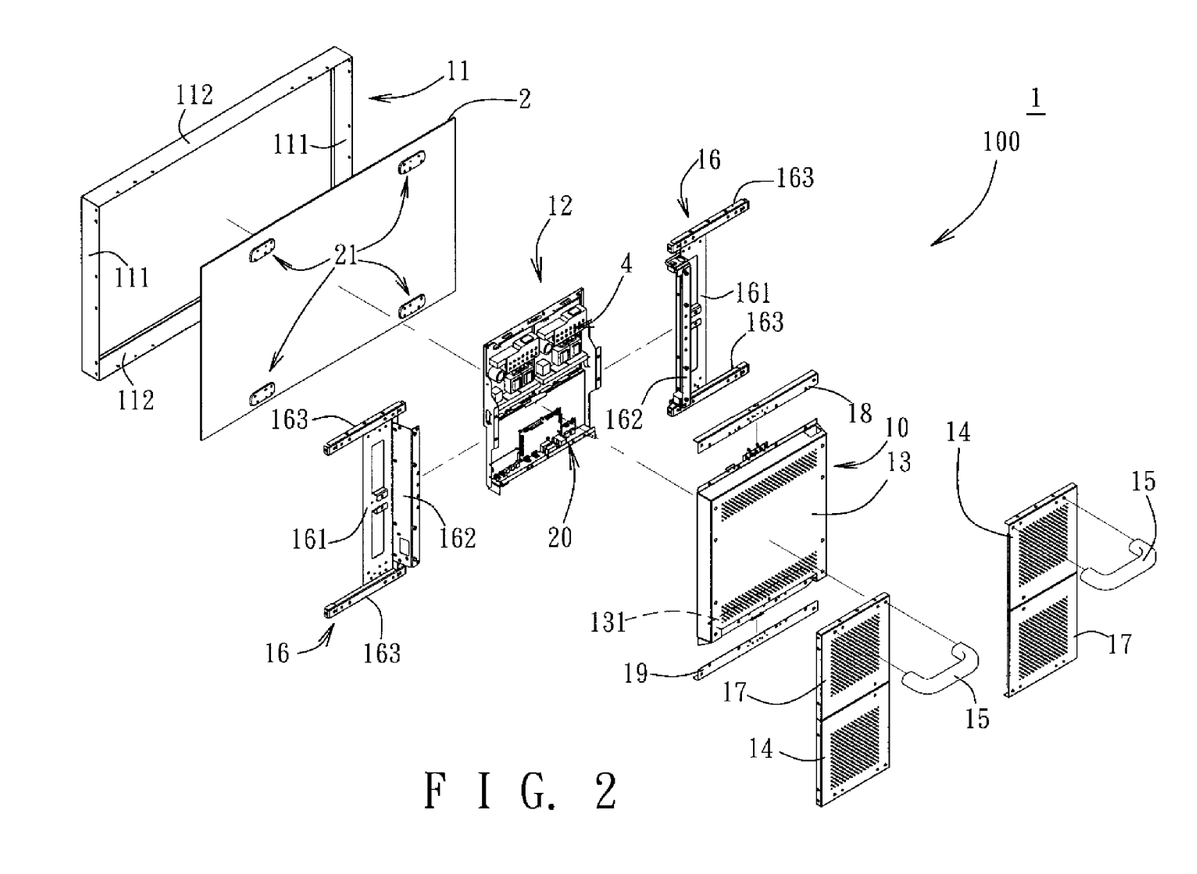
FIG. 2 is an exploded perspective view of the preferred embodiment.
Figure 3:
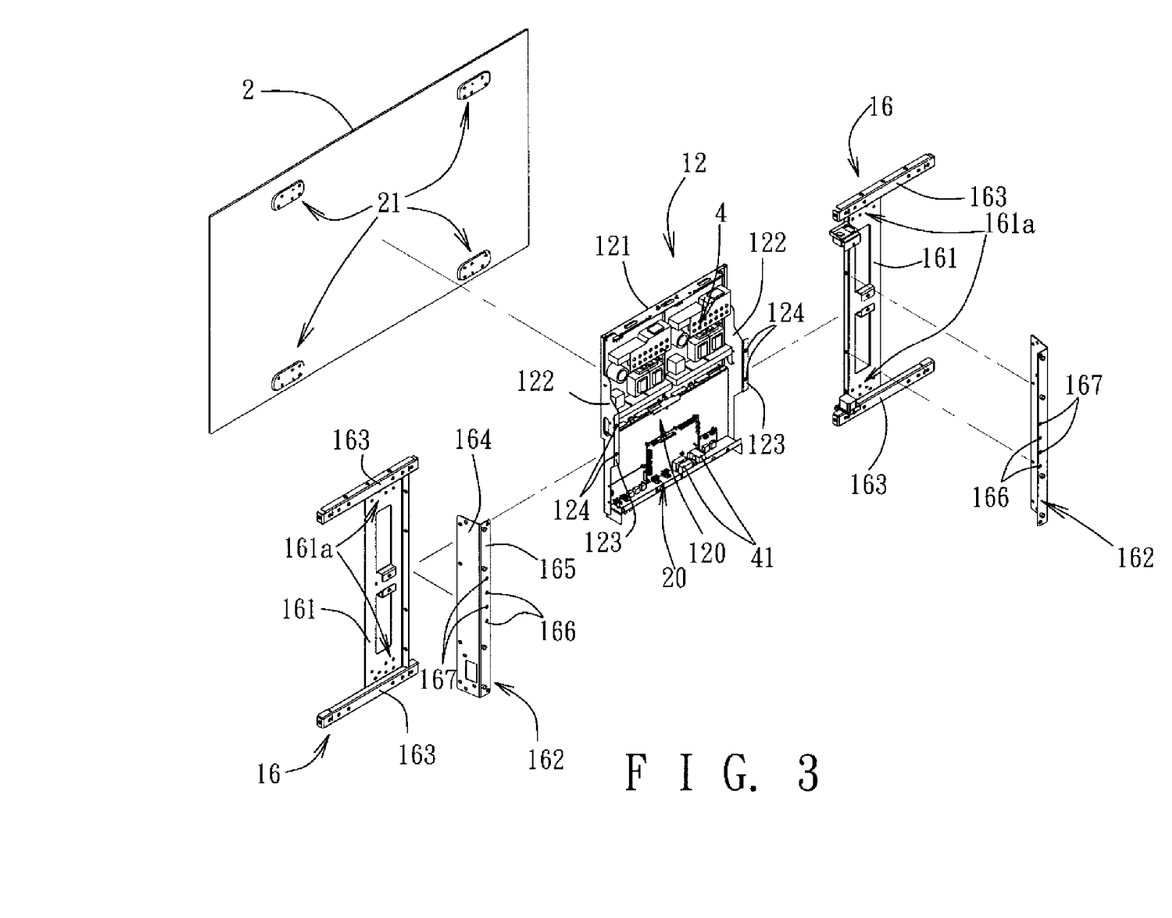
FIG. 3 is an exploded perspective view of a seat body and side frames of the preferred embodiment with a first display panel.

Referring to FIGS. 1 to 3, a housing structure 1 of a display device according to the preferred embodiment of the present invention comprises a frame module 100, an outer frame 11, a pair of first side covers 14, a pair of second side covers 17, upper and lower connecting plates 18, 19, and an insert panel 20.

The frame module 100 can be installed selectively on one of a first display panel 2 (see FIG. 3) and a second display panel 3 (see FIG. 6) which have different sizes. In other words, the frame module 100 used for connection with the first and second display panels 2, 3 has a size specification that is applicable for both display panels 2, 3. The first display panel 2 has a rear face provided with a first fastening hole set 21. The second display panel 3 has a rear face provided with a second fastening hole set 31 (see FIG. 6). Each of the first and second fastening hole sets 21, 31 includes a plurality of fastening holes. In this embodiment, the first display panel 2 and the second display panel 3 may be a 42" display panel and a 52" display panel, respectively. However, the applicable sizes of display panels for the present invention are not limited to these two sizes, and display panels of sizes ranging from 42" to 52" are also possible. The first display panel 2 installed on the housing structure 1 will be first described below.

The frame module 100 includes a casing unit 10 and two side frames 16. The casing unit 10 includes a seat body 12 and a cover body 13. The seat body 12 can be connected to the rear face of the first display panel 2. In this embodiment, the seat body 12 includes a back plate 121, two spaced-apart side plate portions 122 extending rearwardly and respectively from left and right ends of the back plate 121, and two fastening plate portions 123 extending outwardly, sidewardly, and respectively from the side plate portions 122 away from each other. The back plate 121 and the side plate portions 122 cooperatively define a receiving space 120. Each fastening plate portion 123 is provided with a fourth fastening hole set 124. The fourth fastening hole set 124 includes a plurality of fastening holes. The back plate 121 is used for fastening to the rear face of the first display panel 2. An electronic component module 4, which is used for connecting electrically with the first display panel 2, is fixed to the back plate 121 between the side plate portions 122 and within the receiving space 120. The electronic component module 4 may include, for example, a power circuit, a driver IC, etc. The insert panel 20 is disposed on the back plate 121 of the seat body 12 in proximity to a bottom edge thereof and between the side plate portions 122. The insert panel 20 allows exposure of a plurality of electric connecting devices 41 (for example, all kinds of connection ports), which are received within the receiving space 120, for insertion thereinto of plugs of other external electronic components. Further, the insert panel 20 may be connected to the seat body 12 at different heights (for example, along a direction of an arrow shown in FIG. 4). Hence, the insert panel 20 may be adjustably connected to the seat body 12 to suit a height requirement. When the seat body 12 is fixed to the rear face of the first display panel 2, the insert panel 20 and the bottom edge of the first display panel 2 have a sufficient space therebetween to accommodate some electronic components having larger plugs.

The two side frames 16 are connected respectively to the left and right sides of the seat body 12 at a first height position in this embodiment, and are similarly disposed on the rear face of the first display panel 2. Each side frame 16 includes a main plate 161, a connecting plate 162, and two spaced-apart connecting rods 163. The main plate 161 is provided with a third fastening hole set (161a). The third fastening hole set (161a) includes a plurality of fastening holes formed in the main plate 161. In this embodiment, the fastening holes of the third fastening hole set (161a) are formed in the main plate 161 in proximity to top and bottom sides thereof. The two connecting rods 163 are connected respectively to and extend horizontally and respectively from the top and bottom sides of the main plate 161. The connecting plate 162 has a substantially L-shaped cross section, and includes interconnected first and second plate portions 164, 165. The connecting plate 162 is connected to the main plate 161 through the first plate portion 164, and is disposed between the connecting rods 163 such that the second plate portion 165 is disposed rearwardly of the main plate 161. In this embodiment, the second plate portion 165 is provided with a fifth fastening hole set 166 including a plurality of fastening holes, and a sixth fastening hole set 167 including a plurality of fastening holes alternating with the fastening holes of the fifth fastening hole set 166.

Figure 4:
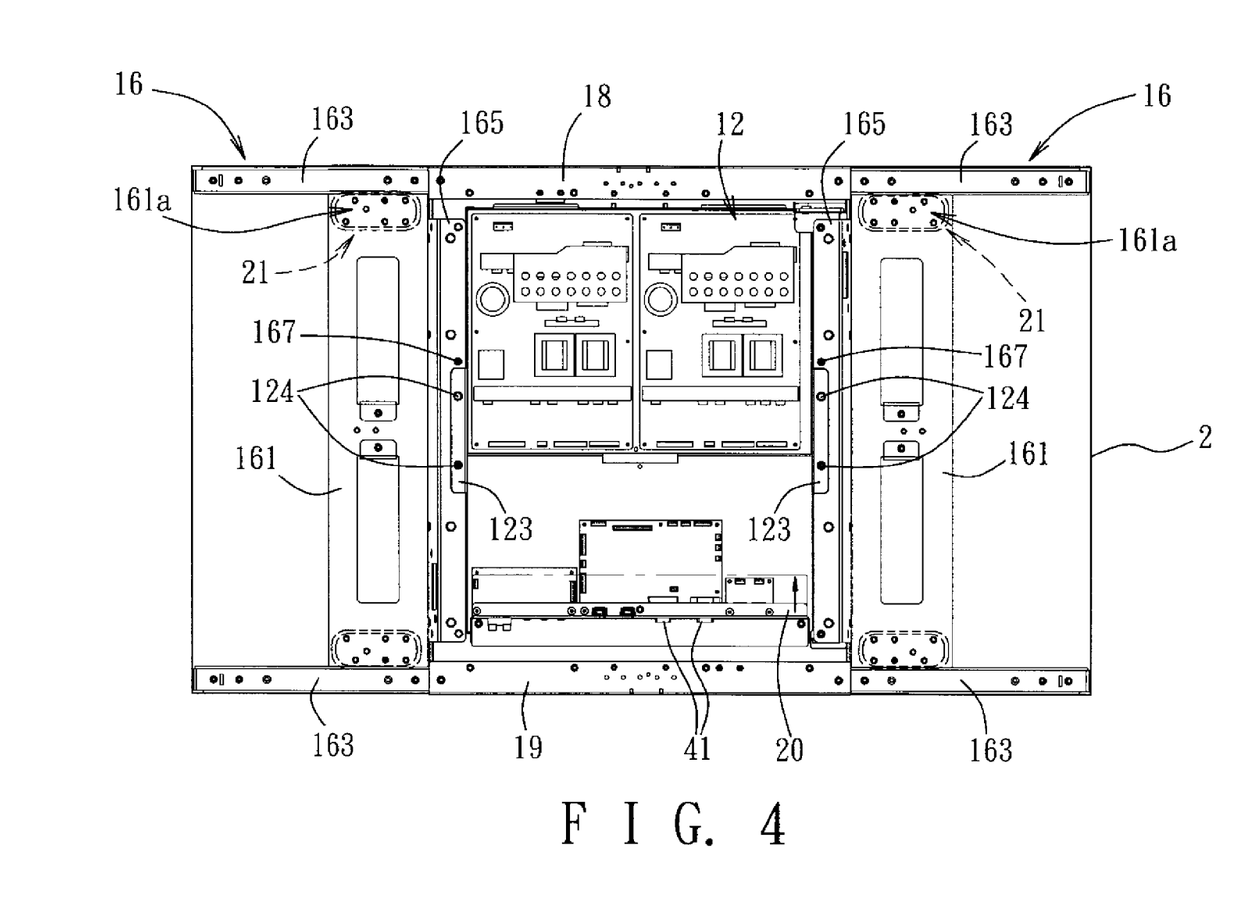
FIG. 4 is a schematic rear view, illustrating assembly of the seat body and the side frames on the first display panel.

With reference to FIGS. 3 and 4, the side frames 16 are connected respectively to the left and right sides of the seat body 12 by aligning respectively the fifth fastening hole sets 166 in the second plate portions 165 of the connecting plates 162 with the fourth fastening hole sets 124 in the fastening plate portions 123 of the seat body 12, and then by using screws to fasten fixedly the second plate portions 165 of the connecting plates 162 of the side frames 16 to the respective fastening plate portions 123 of the seat body 12, thereby disposing the side frames 16 at the first height position relative to the seat body 12. At this time, the third fastening hole sets (161a) in the main plates 161 of the side frames 16 are aligned respectively with the first fastening hole sets 21 in the rear face of the first display panel 2, and by using screws, the main plates 161 of the side frames 16 can be connected fixedly to the rear face of the first display panel 2. It should be noted that the third fastening hole set (161a) in each main plate 161 aligned with the respective first fastening hole set 21 in the rear face of the first display panel 2 can mean that the number of the fastening holes of the third fastening hole set (161a) at the top or bottom side of the main plate 161 is larger than that of the fastening holes of the respective first fastening hole set 21, and as long as a portion of the fastening holes of the first fastening hole set 21 is aligned with a portion of the fastening holes of the third fastening hole set (161a), the main plates 161 of the side frames 16 can be connected to the rear face of the first display panel 2. There is no need to align all of the fastening holes of the first fastening hole set 21 with all of the fastening holes of the third fastening hole set (161a).

Referring once again to FIGS. 1 to 3, the outer frame 11 includes spaced-apart left and right frame rods 111, and spaced-apart upper and lower frame rods 112 connected to and cooperating with the left and right frame rods 111 to form a frame structure. The outer frame 11 is used for framing an outer periphery of the first display panel 2. When the outer frame 11 and the side frames 16 are positioned on the first display panel 2, the connecting rods 163 of the side frames 16 are adjacent correspondingly to the upper and lower frame rods 112 of the outer frame 11, and are connected to the same by using screws, so that there is a connecting relationship between the outer frame 11 and the side frames 16. In this embodiment, the left and right frame rods 111 have the same structure formed from the same mold, but differ only in directions during connection with the upper and lower frame rods 112. The upper and lower frame rods 112 have the same structure formed from the same mold, but differ only in directions during connection with the left and right frame rods 111. Hence, the mold for forming each of the left and right frame rods 111 or each of the upper and lower frame rods 112 has a size that is reduced as compared to a mold for forming the whole outer frame 11.

Figure 5:
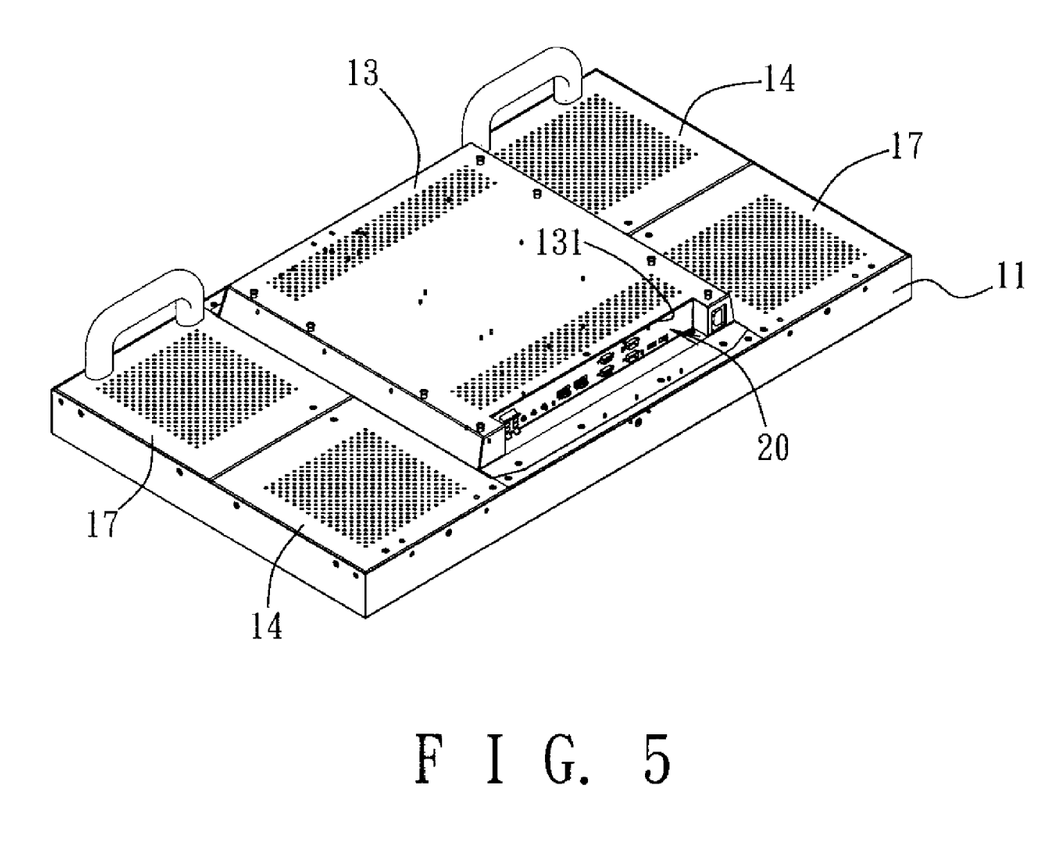
FIG. 5 is a bottom perspective view of the preferred embodiment.

Each of the upper and lower connecting plates 18, 19, in this embodiment, is configured as a corner plate having an L-shaped cross section. The upper and lower connecting plates 18, 19 have the same structure formed from the same mold. Two opposite ends of each of the upper and lower connecting plates 18, 19 are connected respectively to one of the connecting rods 163 of one of the side frames 16 and one of the connecting rods 163 of the other side frame 16, so that the upper connecting plate 18 is disposed between the connecting rods 163 of the side frames 16 which are disposed on the top sides of the main plate 161, while the lower connecting plate 19 is disposed between the connecting rods 163 of the side frames 16 which are disposed on the bottom side of the main plate 161. The cover body 13 has a body structure with a front opening, and is connected to a rear side of the seat body 12 so as to cover the rear side and the receiving space 120 of the seat body 12. Left and right sides of the cover body 13 are connected respectively to the second plate portions 165 of the connecting plates 162 of the side frames 16 by using screws. Top and bottom sides of the cover body 13 are fastened respectively to the upper and lower connecting plates 18, 19. In this embodiment, the bottom side of the cover body 13 is formed with a cutout 131 to expose the insert panel 20 therefrom, as shown in FIG. 5.

The two first side covers 14 are disposed respectively on the left and right sides of the casing unit 10, and are disposed respectively on rear sides of the side frames 16. Each first side cover 14 is connected to one of the connecting rods 163 of a respective side frame 16, one of the left and right frame rods 111 of the outer frame 11, and one of the upper and lower frame rods 112 of the outer frame 11 by using screws. In this embodiment, the first side covers 14 have the same structure formed from the same mold, and are disposed diagonally on the rear face of the first display panel 2.

The two second side covers 17 are disposed respectively on the left and right sides of the casing unit 10, and are disposed respectively on the rear sides of the side frames 16. Each second side cover 17 is connected to one of the connecting rods 163 of a respective side frame 16, one of the left and right frame rods 111 of the outer frame 11, and one of the upper and lower frame rods 112 of the outer frame 11 by using screws. In this embodiment, the second side covers 17 have the same structure formed from the same mold, and are disposed diagonally on the rear face of the first display panel 2. That is, one of the second side covers 17 is disposed on top of one of the first side covers 14, and the other one of the second side covers 17 is disposed below the other first side cover 14.

From the aforesaid description, by separating a side cover component at each of the left and right sides of the casing unit 10 into superimposed first and second side covers 14, 17, the size of a mold for making the side cover component can be reduced, thereby minimizing the costs for making the mold.

A pair of handgrips 15 (see FIG. 2) are disposed respectively on the left and right sides of the casing unit 10. One of the handgrips 15 is connected integrally to one of the first side covers 14 and one of the connecting rods 163 of one of the side frames 16 by using screws. The other one of the handgrips 15 is connected integrally to one of the second side covers 17 and one of the connecting rods 163 of the other side frame 16 by using screws. Through such a connection, when the first display panel 2 is installed on the housing structure 1 to form the display device, an assembly of the first display panel 2 and the housing structure 1 can be lifted by using the handgrips 15, thereby facilitating movement of the display device from one place to another.

Below is a description of how the aforesaid frame module 100 with the same specification can be connected with the second display panel 3.

Figure 6:
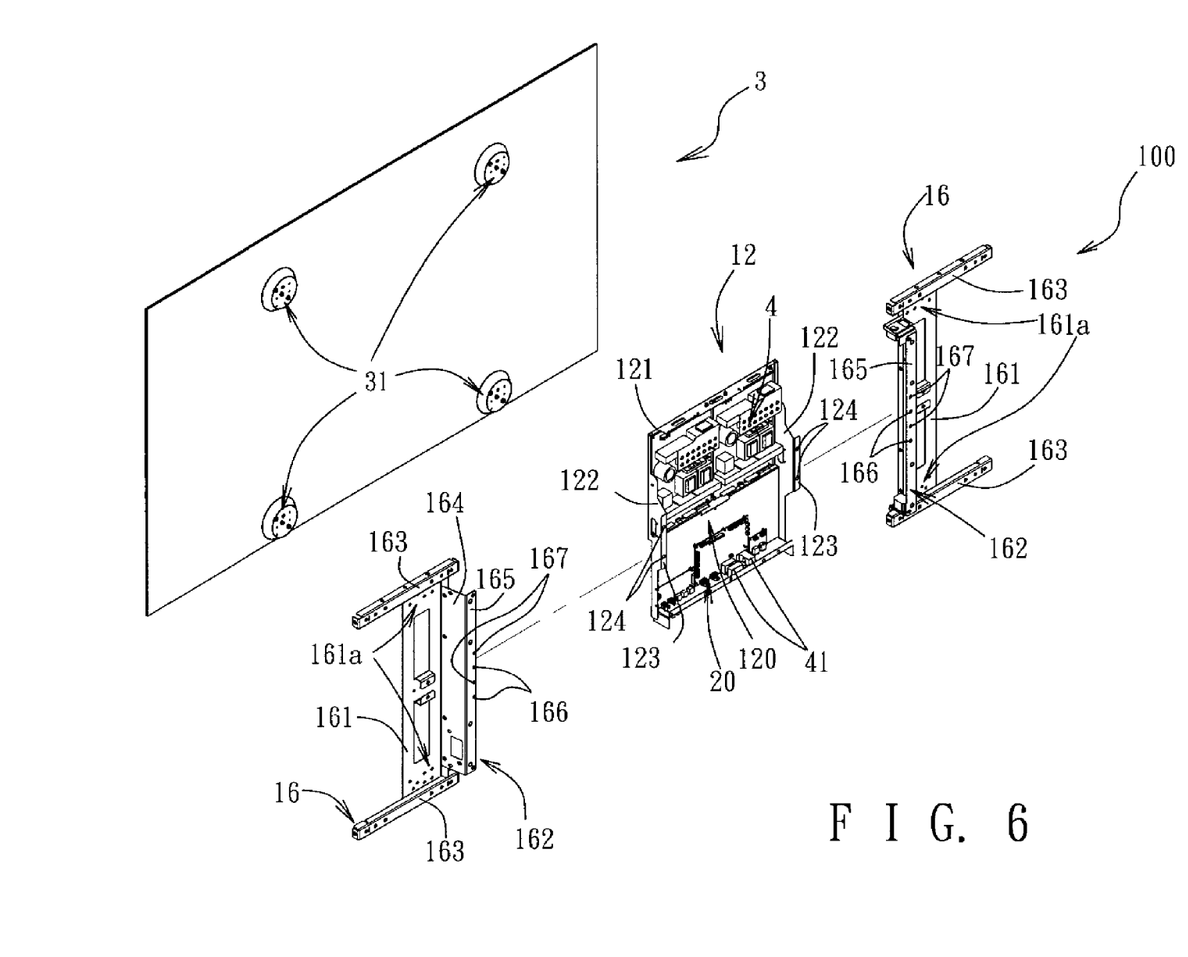
FIG. 6 is an exploded perspective view of the seat body and the side frames of the preferred embodiment with a second display panel.
Figure 7:
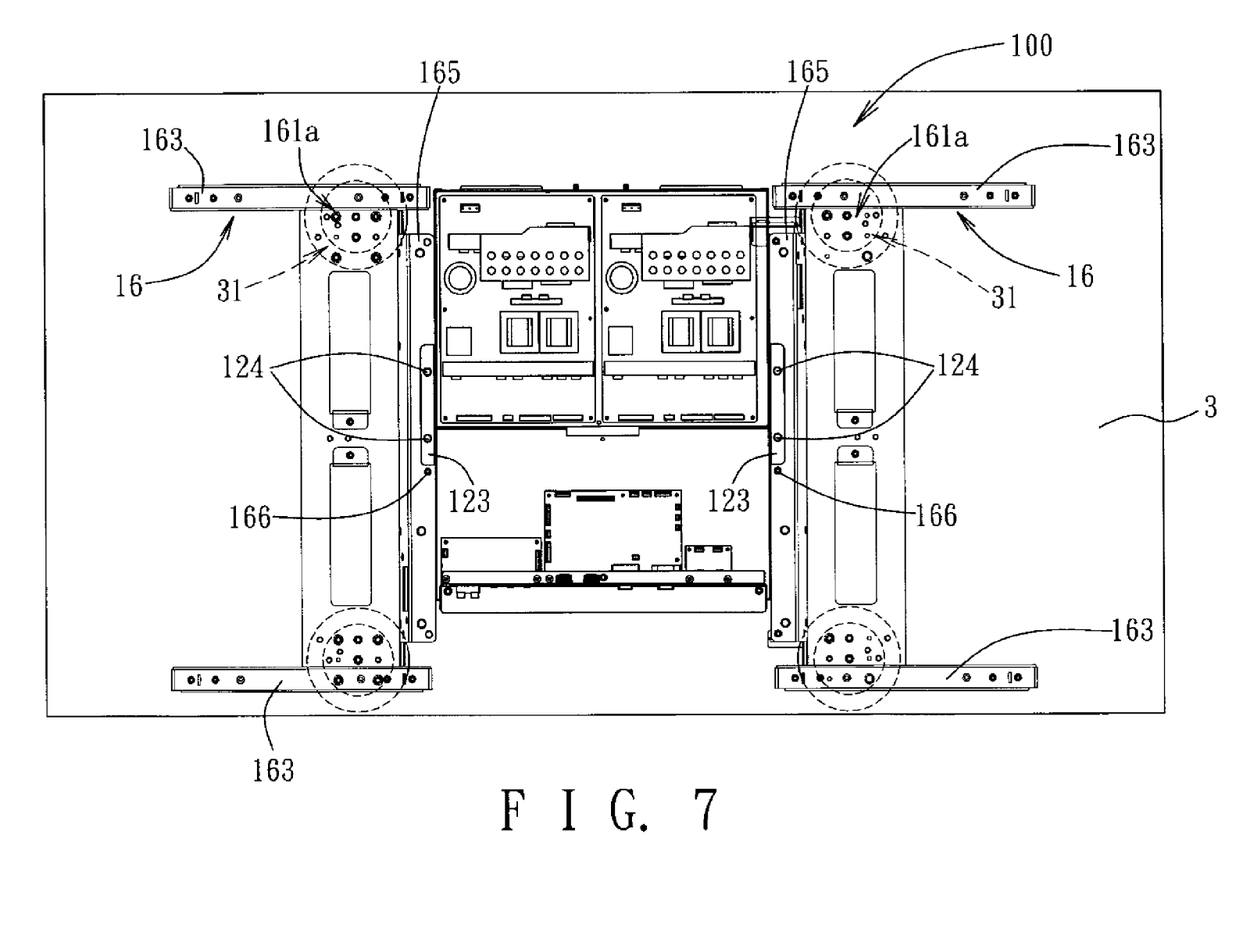
FIG. 7 is a schematic rear view, illustrating assembly of the seat body and the side frames on the second display panel.

Referring to FIGS. 6 and 7, when the seat body 12 and the side frames 16 of the frame module 100 are connected to a rear face of the second display panel 3, the seat body 12 is similarly connected to the rear face of the second display panel 3. The side frames 16 are connected respectively to the left and right sides of the seat body 12 by aligning respectively the sixth fastening hole sets 167 with the fourth fastening hole sets 124 of the fastening plate portions 123 of the seat body 12, and then by using screws to fasten fixedly the second plate portions 165 of the connecting plates 162 of the side frames 16 to the respective fastening plate portions 123 of the seat body 12. As a result, the side frames 16 are disposed at a second height position relative to the seat body 12 that is lower than the first height position shown in FIG. 4. The third fastening hole sets (161a) in the main plates 161 of the side frames 16 are first aligned respectively with the second fastening hole sets 31 on the rear face of the second display panel 3, and then by using screws, the main plates 161 of the side frames 16 are connected fixedly to the rear face of the second display panel 3. Similarly, alignment of the third fastening hole sets (161a) of the main plates 161 with the second fastening hole sets 31 on the rear face of the second display panel 3 can mean that a portion of the fastening holes of the second fastening hole sets 31 is aligned with a portion of the fastening holes of the third fastening hole sets (161a) to facilitate a fastening operation. There is no need to align all of the fastening holes of the second fastening hole set 31 with the fastening holes of the third fastening hole set (161a).

Hence, from the aforesaid description, through the structural design of the seat body 12 and the side frames 16 (for example, including pairing of the fastening holes of the plurality of fastening hole sets), the present invention can achieve a single size specification of the frame module 100 which can be connected to two different sizes of the display panels 2, 3.

Hence, when the frame module 100 is connected to the second display panel 3, which has a size specification different from that of the first display panel 2, the outer frame 11, the first and second side covers 14, 17, and the upper and lower connecting plates 18, 19 must have size specifications corresponding to the size specification of the second display panel 3. However, the structures of the outer frame 11, the first and second side covers 14, 17, and the upper and lower connecting plates 18, 19 are similar to the aforesaid description. The two first side covers 14 are similarly disposed diagonally on the rear face of the second display panel 3 so that the first side covers 14 have structures that can be commonly used by both of the first and second display panels 2, 3. The two second side covers 17 are also disposed diagonally on the rear face of the second display panel 3 so that the second side covers 17 have structures that can be commonly used by both of the first and second display panels 2, 3.

In summary, through the structural design of the side frames 16 of the frame module 100 which can be connected to the casing unit 10 at different height positions, the present invention can achieve the purpose of using a single size specification of the frame module 100 applied to the different size specifications of the display panels 2, 3. Hence, it is not necessary to make separate molds of frame modules 100 for different sizes of the display panels 2, 3, thereby reducing the number of required molds and therefore the costs associated with the same. Further, since the first side covers 14 and the second side covers 17 disposed diagonally on the display panel 2, 3 are formed from the same mold, the present invention can similarly achieve the purpose of minimizing the costs of making the molds therefor. Therefore, the objects of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A housing structure of a display device adapted to provide installation of a selected one of first and second display panels thereto, the first display panel having a rear face provided with a first fastening hole set, the second display panel having a rear face provided with a second fastening hole set, said housing structure comprising:
   a casing unit including
      a seat body for connection with the rear face of one of the first and second display panels, said seat body defining a receiving space for receiving therein an electronic component module which is used for connecting electrically with one of the first and second display panels, and
      a cover body connected to said seat body and covering said receiving space; and
   two side frames each provided with a third fastening hole set, said side frames being respectively disposed on and connected to left and right sides of said casing unit at a selected one of a first height position and a second height position;
   wherein, when said side frames are in said first height position, said third fastening hole set is adapted to be aligned with said first fastening hole set so that said side frames can be connected to the rear face of the first display panel, and when said side frames are in said second height position, said third fastening hole set is adapted to be aligned with said second fastening hole set so that said side frames can be connected to the rear face of the second display panel.

2. The housing structure of claim 1, wherein left and right sides of said seat body are respectively provided with a fourth fastening hole set, each of said side frames being further provided with a fifth fastening hole set and a sixth fastening hole set alternating with each other, said side frames being connected respectively to said left and right sides of said casing unit at said first height position when said fourth and fifth fastening hole sets are aligned to each other, said side frames being connected respectively to said left and right sides of said casing unit at said second height position when said fourth and sixth fastening hole sets are aligned to each other.

3. The housing structure of claim 2, wherein said seat body includes a back plate, two spaced-apart side plate portions extending rearwardly and respectively from left and right ends of said back plate, and two fastening plate portions connected respectively to said side plate portions, said fourth fastening hole sets being provided respectively on said fastening plate portions.

4. The housing structure of claim 3, wherein each of said side frames includes a main plate, and a connecting plate connected to said main plate, said connecting plate including a first plate portion and a second plate portion interconnected to form an L-shaped body, said first plate portion being connected to said main plate such that said second plate portion is disposed rearwardly of said main plate, said fifth and sixth fastening hole sets of each of said side frames being provided on said second plate portion.

5. The housing structure of claim 4, wherein each of said side frames further includes two spaced-apart connecting rods connected respectively to top and bottom sides of said main plate, said housing structure further comprising an outer frame for framing the first or second display panel, said connecting rods being connected to said outer frame.

6. The housing structure of claim 5, wherein said outer frame includes spaced-apart upper and lower frame rods, and spaced-apart left and right frame rods connected to said upper and lower frame rods, said upper and lower frame rods being formed from the same mold, said left and right frame rods being formed from the same mold.

7. The housing structure of claim 5, further comprising:
   a pair of first side covers disposed respectively on said left and right sides of said casing unit, connected to said outer frame, and connected respectively to said side frames, said first side covers being adapted to be disposed diagonally on the first or second display panel, and having the same structure; and
   a pair of second side covers disposed respectively on said left and right sides of said casing unit, connected to said outer frame, and connected respectively to said side frames, said second side covers being adapted to be disposed diagonally on the first or second display panel, one of said second side covers being disposed on top of one of said first side covers, the other one of said second side covers being disposed below the other one of said first side covers, said second side covers having the same structure.

8. The housing structure of claim 7, further comprising an upper connecting plate and a lower connecting plate, said upper connecting plate being connected to said side frames and being disposed between said connecting rods of said side frames which are disposed on said top sides of said main plate, said lower connecting plate being connected to said side frames and being disposed between said connecting rods of said side frames which are disposed on said bottom sides of said main plate, said upper and lower connecting plates being connected respectively to top and bottom sides of said cover body.

9. The housing structure of claim 8, further comprising a pair of handgrips disposed respectively on said left and right sides of said casing unit, one of said handgrips being connected integrally to one of said first side covers and one of said side frames, the other one of said handgrips being connected integrally to one of said second side covers and the other one of said side frames.

10. The housing structure of claim 9, further comprising an insert panel connected to said seat body between said side plate portions, adjustable upwardly and downwardly relative to said seat body, and adapted to expose a plurality of electric connecting devices which are received in said receiving space, said bottom side of said cover body being formed with a cutout to expose said insert panel.

11. The housing structure of claim 2, wherein said third fastening hole set includes a plurality of fastening holes, said first and second fastening hole sets respectively including a plurality of fastening holes, a portion of said fastening holes of said third fastening hole set of each of said side frames being adapted to be aligned with a portion of said fastening holes of said first fastening hole set of the first display panel when said side frames are disposed at a first height position, a portion of said fastening holes of said third fastening hole set of each of said side frames being adapted to be aligned with a portion of said fastening holes of said second fastening hole set of the second display panel when said side frames are disposed at a second height position.

12. The housing structure of claim 10, wherein said third fastening hole set includes a plurality of fastening holes, said first and second fastening hole sets respectively including a plurality of fastening holes, a portion of said fastening holes of said third fastening hole set of each of said side frames being adapted to be aligned with a portion of said fastening holes of said first fastening hole set of the first display panel when said side frames are disposed at a first height position, a portion of said fastening holes of said third fastening hole set of each of said side frames being adapted to be aligned with a portion of said fastening holes of said second fastening hole set of the second display panel when said side frames are disposed at a second height position.

13. A display device comprising:
- a display panel; and
- a housing structure including
  - a casing unit including
    - a seat body connected to a rear face of said display panel and defining a receiving space for receiving therein an electronic component module which is used for connecting electrically with said display panel, and
    - a cover body connected to said seat body and covering said receiving space; and
  - two side frames each including
    - a main plate connected to said rear face of said display panel, and
    - a connecting plate including a first plate portion and a second plate portion interconnected to form an L-shaped body, said first plate portion being connected to said main plate such that said second plate portion is disposed rearwardly of said main plate, said side frames being connected respectively to said left and right sides of said casing unit through said second plate portions of said connecting plates of said side frames.

14. The display device of claim 13, wherein said seat body includes a back plate, two spaced-apart side plate portions extending rearwardly and respectively from left and right ends of said back plate, and two fastening plate portions connected respectively to said side plate portions, said second plate portions of said connecting plates of said side frames being connected respectively to said fastening plate portions.

15. The display device of claim 14, wherein each of said side frames further includes two spaced-apart connecting rods connected respectively to top and bottom sides of said main plate, said housing structure further including an outer frame framing said display panel, said connecting rods being connected to said outer frame.

16. The display device of claim 15, wherein said outer frame includes spaced-apart upper and lower frame rods, and spaced-apart left and right frame rods connected to said upper and lower frame rods, said upper and lower frame rods being formed from the same mold, said left and right frame rods being formed from the same mold.

17. The display device of claim 15, wherein said housing structure further includes
- a pair of first side covers disposed respectively on said left and right sides of said casing unit, connected to said outer frame, and connected respectively to said side frames, said first side covers being disposed diagonally on said display panel and having the same structure; and
- a pair of second side covers disposed respectively on said left and right sides of said casing unit, connected to said outer frame, and connected respectively to said side frames, said second side covers being disposed diagonally on said display panel, one of said second side covers being disposed on top of one of said first side covers, the other one of said second side covers being disposed below the other one of said first side covers, said second side covers having the same structure.

18. The display device of claim 17, wherein said housing structure further includes an upper connecting plate and a lower connecting plate, said upper connecting plate being connected to said side frames and being disposed between said connecting rods of said side frames which are disposed on said top sides of said main plate, said lower connecting plate being connected to said side frames and being disposed between said connecting rods of said side frames which are disposed on said bottom sides of said main plate, said upper and lower connecting plates being connected respectively to top and bottom sides of said cover body.

19. The display device of claim 18, wherein said housing structure further includes a pair of handgrips disposed respectively on said left and right sides of said casing unit, one of said handgrips being connected integrally to one of said first side covers and one of said side frames, the other one of said handgrips being connected integrally to one of said second side covers and the other one of said side frames.

20. The display device of claim 19, wherein said housing structure further includes an insert panel connected to said seat body between said side plate portions, adjustable upwardly and downwardly relative to said seat body, and adapted to expose a plurality of electric connecting devices which are received in said receiving space, said bottom side of said cover body being formed with a cutout to expose said insert panel.

* * * * *